July 13, 1965   S. J. GRILLO   3,194,067
METEOROLOGICAL ROCKETSONDE
Filed Sept. 29, 1961   3 Sheets-Sheet 1

INVENTOR.
SALVATORE J. GRILLO

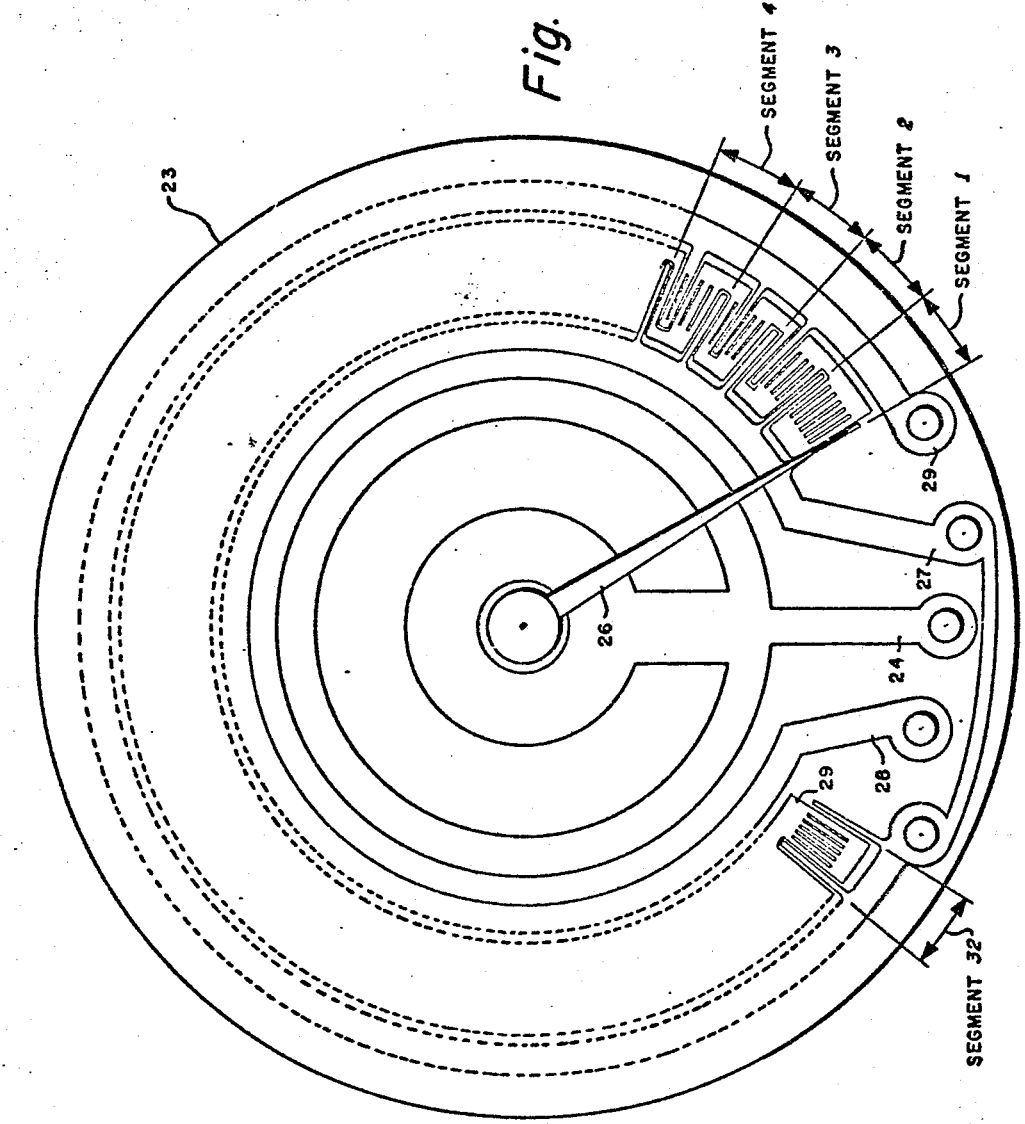

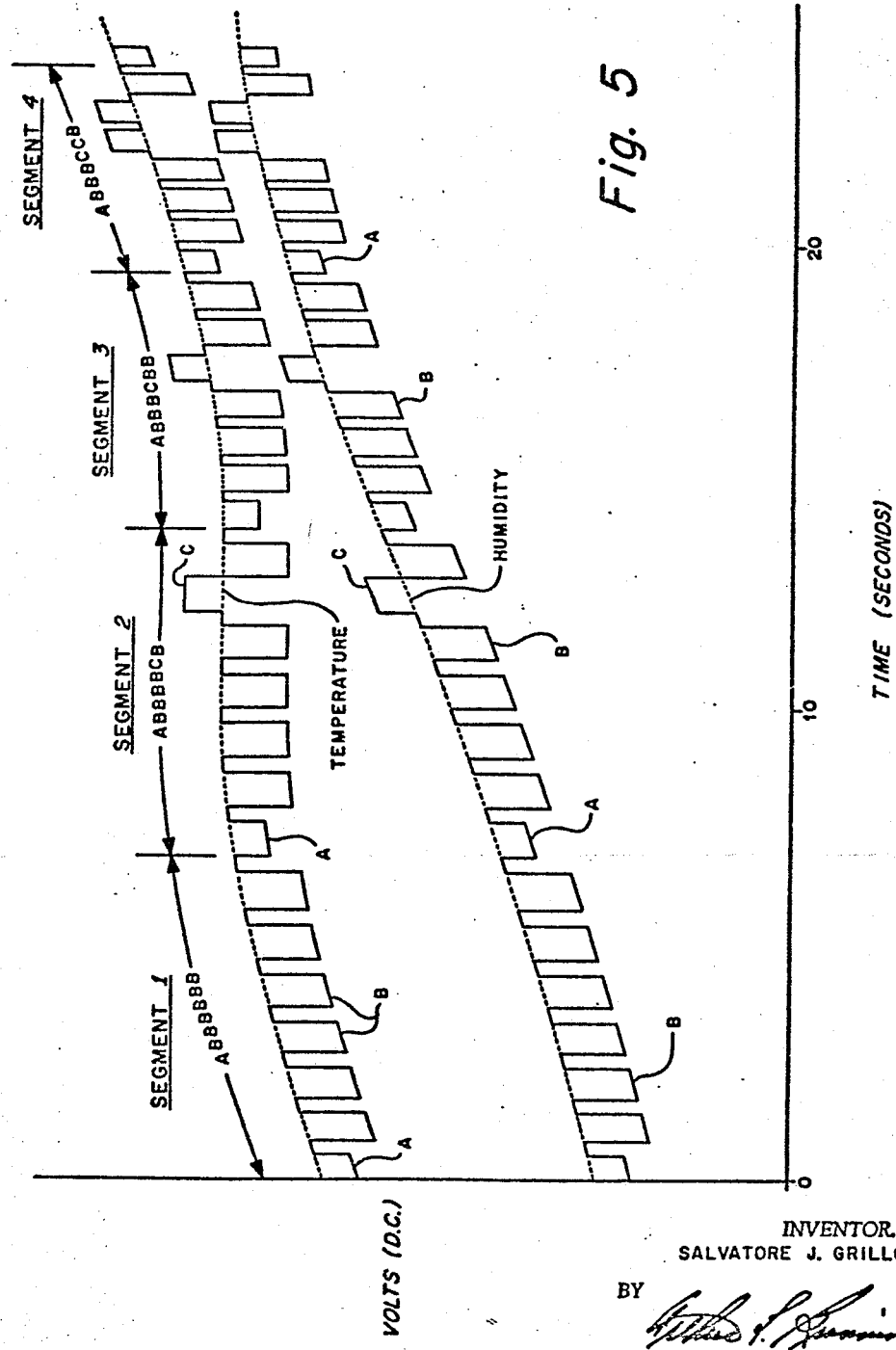

United States Patent Office 3,194,067
Patented July 13, 1965

3,194,067
METEOROLOGICAL ROCKETSONDE
Salvatore J. Grillo, Willow Grove, Pa., assignor to the United States of America as represented by the Secretary of the Navy
Filed Sept. 29, 1961, Ser. No. 141,915
6 Claims. (Cl. 73—170)
(Granted under Title 35, U.S. Code (1952), sec. 266)

The invention described herein may be manufactured and used by or for the Government of the United States of America for governmental purposes without the payment of any royalties thereon or therefor.

The present invention relates to radiosondes for telemetering meteorological conditions such as ambient temperature, humidity, and pressure of the atmosphere during their flight, and more particularly to a radiosonde of the type intended to be propelled into the upper atmosphere by a rocket motor whereupon it telemeters meteorological conditions during its descent to the earth.

Altitudes for meteorological investigations now extend above 300,000 feet by virtue of rocket-propelled radiosondes, or so-called rocketsondes. Recent efforts have been directed to reducing the payload of rocketsondes in order that unit costs would not deter the extent of use desirable in such investigations. In fact, most weather studies are made on a daily time schedule, but the present cost of rocketsondes discourages their use. The results heretofore of these efforts have sacrificed some accuracy and reliability of the data measured. One significant factor contributing to less reliability has been the lack of frequent and comprehensive sampling and transmitting of the measured conditions as the radiosonde traverses an atmospheric gradient from the highest altitude of interest to which it was propelled. Infrequent sampling can produce an inversion of trend in the measured variable, yielding a false picture of a vertical gradient in the atmosphere.

Ideally, the radiosonde should continuously transmit several measured variables which can be separately detected at the receiving station. However, the present state of the art would require that relatively numerous and complex electronic circuits be carried as rocketsonde payload. Alternatively, a commutator and a single transmitter have been used to sequentially transmit the measured variables. For example, an electric motor driven mechanical computator which sequentially feeds temperature, humidity, and pressure signals to the transmitter usually involves mechanical elements of relatively large size and weight, or else they are unable to withstand the severe environmental conditions. Similarly, electronic commutation involves complex circuits and phohibitively large circuit elements. More recent innovations contemplate a mechanical commutator driven by a barometric pressure responsive element or an air-flow responsive impeller. However, these types are found to be ineffective at the high altitudes presently being investigated because of the low pressure gradient and the small amount of air present. It will be recalled that a vertical column of air will vary logarithmically in density and pressure so that at the higher altitudes a large change in elevation will reflect only a small change in pressure and density. It should therefore be apparent that where the commutator operation is dependent upon atmospheric pressure or density, the commutation or sampling rate of the various continuously measured conditions at the higher altitudes will be extremely slow and will gradually increase as the radiosonde descends into the lower atmosphere. At the lower sampling rates, obviously much of the measured data will not have been transmitted and recorded.

Accordingly, it is an object of the present invention to provide an improved radiosonde which is capable of substantially continuously telemetering a plurality of atmospheric conditions at a rate independent of the altitude, and in which comprehensive and synoptic measurements of meteorological data are obtained during its descent from the upper atmosphere to the earth.

Another object of the invention is to provide an improved radiosonde for telemetering meteorological data in which an interrupted transmission will not nullify the overall atmospheric traverse; and with which conditions such as temperature, humidity, pressure and calibration data are substantially continuously transmitted by a single transmitter.

Still another object of the invention is to provide an improved radiosonde which is constructed at a relatively low unit cost, which forms a relatively small and compact payload for rocket propulsion to high altitudes, and which can withstand environments of high speed and acceleration and large variations in ambient temperature.

Various other objects and advantages will appear from the following description of one embodiment of the invention, and the most novel features will be particularly pointed out hereinafter in connection with the appended claims.

In the accompanying drawing:

FIG. 2 represents a magnified view of the electrical contact face of a coding switch in the radiosonde illustrated in FIG. 1;

Figure 4:
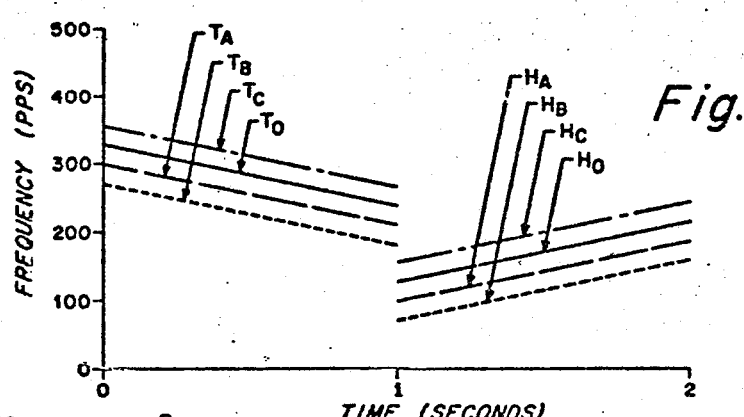
Figure 1:
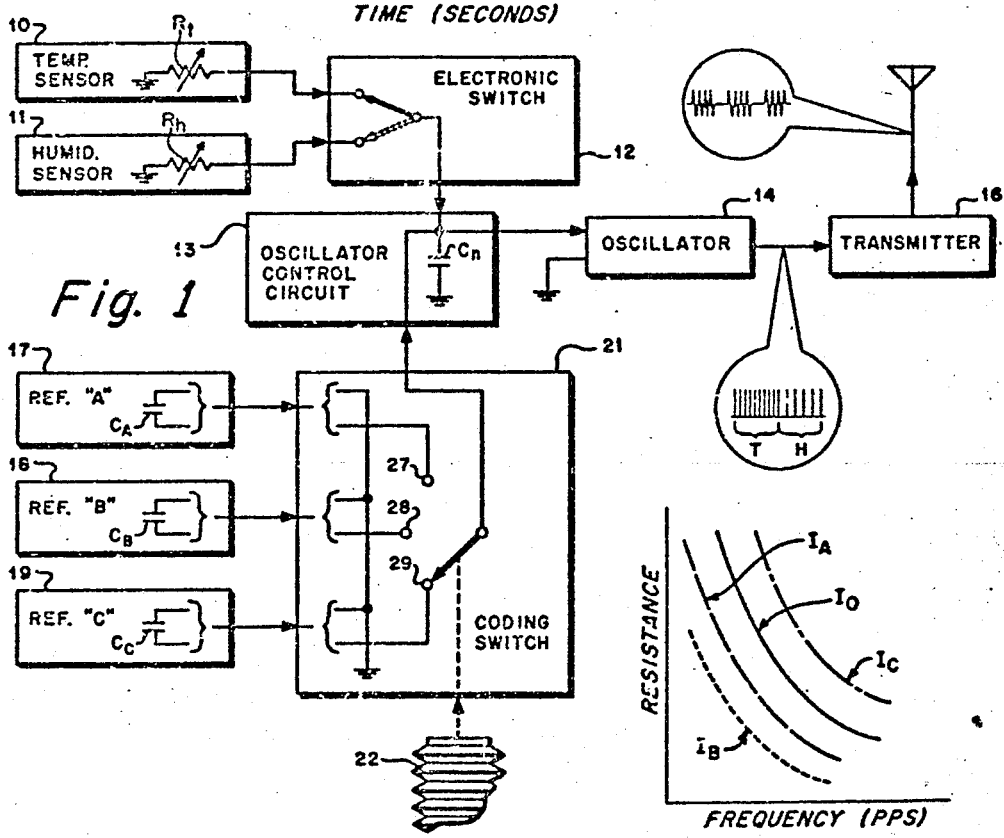
FIG. 1 represents a schematic block diagram with exemplary circuitry of a radiosonde constructed in accordance with the present invention.
Figure 6:
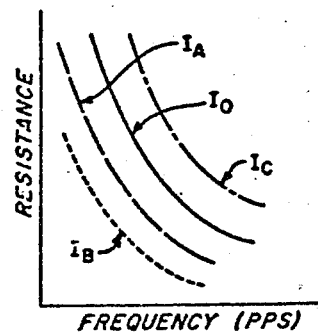

FIG. 4 graphically represents the frequency variations developed at the output of an oscillator control circuit in the radiosonde illustrated in FIG. 1;

FIG. 5 graphically represents a typical chart of telemetered atmospheric conditions at the recorder in the receiving station illustrated in FIG. 4; and FIG. 6 graphically represents the electrical characteristics of a typical oscillator as applied to the present invention.

A rocketsonde generally contains an instrumentation package which is ejected from a rocket head near the apogee of its trajectory. A parachute then stabilizes and retards the package during its descent or so-called atmospheric traverse. In the illustrated embodiment of the invention, a pair of temperature and humidity sensors 10, and 11, respectively, are placed in the package in such a manner that they are exposed to the ambient atmosphere and produce distinct electrical signals which vary proportionately with the temperature and humidity, respectively. Various sensing elements are contemplated. For example, distinct variable resistances $R_t$ and $R_h$ representing temperature and humidity are obtainable with a thermistor and a lithium chloride cell, respectively. However, other electrical parameters may be used, such as voltages, capacitance, inductance and current without departing from the spirit of the invention. Moreover, other atmospheric conditions instead of temperature and humidity may be selected for measurement.

The temperature and humidity sensors are connected to two input terminals of an electronic selector switch 12 which alternately produces the temperature and humidity signals at its output terminal in a fixed time cycle. The switch 12 is shown schematically as a movable contact continuously connected to an output terminal and alternately positioned between two input terminals. A convenient switching cycle, which of course may be varied to suit requirements, has been selected as 0.5 c.p.s. (cycles per second). The output terminal is connected to one of two input terminals of an oscillator control circuit 13 whose one output terminal, in turn, is connected to the input of an oscillator 14. The circuit 13 may be of any conventional electrical design by which the output signal therefrom would be indicative of the combined inputs as modified by each other. In the illustrated embodiment, the circuit 13 includes a capacitor $C_n$ connected on one side to ground and on the other side in common with the two input terminals and the output terminal. Of course, it is obvious that the particular circuitry employed would depend on the nature of the input signals. As explained hereinbelow, the oscillator control circuit 13 provides a means for modifying the cyclic temperature-humidity signal from the switch 12. The oscillator 14 may be of any conventional type wherein the pulse rate at the output thereof varies with the electrical signal at its input. In the illustrated example, it is contemplated that the oscillator 14 produce a train of pulses in which the pulse rate varies with the input impedance. Referring to FIG. 6, the curves $I_0$, $I_A$, $I_B$ and $I_C$ demonstrate the shift in p.p.s. (pulses per second) for variations in input resistance at discreet input impedance levels. Thus, for a given impedance on curve $I_0$, the pulses per second will increase along the curve $I_0$ as the input resistance decreases. For a given input resistance, a change in overall input impedance will shift the frequency upward or downward as shown by curves $I_A$, $I_B$ and $I_C$. The electrical signals produced by the sensors 10 and 11, such as variable resistances $R_t$ and $R_h$, should be of sufficient variance to each other that two distinct ranges of pulse rates are generated by the oscillator 14 as the electronic switch 12 alternately switches between the two sensors 10 and 11. The total range of pulse rate variation in the illustrated embodiment is 0 to 500 p.p.s. (pulses per second), however, it is contemplated that other ranges of pulse rates may be used without departing from the spirit of the invention. The waveform from the oscillator 14 for a complete switching cycle is shown in the circle inset directed to the output of the oscillator 14. It will be observed that the temperature (T) and humidity (H) pulse rates are quite discernible from each other. The pulse rate for the temperature portion of the cycle, of course, will vary with the ambient temperature, and similarly the pulse rate for the humidity portion of the cycle will vary with the humidity. This is graphically shown in FIG. 4 by the curves $T_0$ and $H_0$ which represent unmodified temperature and humidity signals, respectively, at the output of the oscillator 14.

The measured data appearing as pulses at the output of the oscillator 14 is used to modulate a carrier wave accordingly in a radio transmitter 16. In the illustrated embodiment, a carrier wave frequency of 403 megacycles per second is modulated at the pulse rate ranging from 0 to 500 p.p.s. in accordance with the variations dictated by the electrical signal appearing at the input to the oscillator 14. This carrier frequency is also a matter of choice and it is selected to suit conditions or to meet specifications. The waveform at the output of the transmitter 16 is graphically illustrated in the circle inset directed to the antenna of the transmitter 16. This waveform illustrates a series of three pulses which are spaced a distance corresponding to the space between three pulses at the output of the oscillator 14.

As stated previously, the temperature-humidity signal from the electronic switch 12 applied to the one input terminal of the oscillator control circuit 13 is connected in common with the other input terminal, the output terminal, and the capacitor $C_n$ in the oscillator control circuit 13 to produce thereby a combined signal as modified by each other. In the illustrated embodiment, this other input represents pressure in coded form, and is derived from three distinct reference capacitances $C_A$, $C_B$, and $C_C$ contained in references 17, 18, and 19, respectively. Depending upon which one of the references 17, 18, and 19 is connected to the oscillator control circuit 13, the total impedance at the input to the oscillator 14 will vary and modify the temperature and humidity pulse rates a discrete amount. FIG. 4 graphically illustrates typical modifications of $T_0$ by the curves $T_A$, $T_B$, and $T_C$, and of $H_0$ by the curves $H_A$, $H_B$, and $H_C$ caused by the references A, B, and C, respectively. Each of the references 16, 17, and 18 are selectively connected to the oscillator control circuit 13 in permutations representative of discrete barometric pressures by a coding switch 21. FIG. 1 shows the switch 21 diagrammatically as comprising a movable contact continuously connected to the output terminal and selectively positioned between three input circuits 27, 28 and 29. The actual construction of the switch 21 is described hereinbelow. A pressure-responsive bellows or diaphragm 22 mechanically operates the switch 21.

The coding is best described with reference to FIG. 2. The coding switch 21 primarily comprises a nonconducting circular disk 23 having four distinct and electrically separated conducting circuits printed thereon. One circuit 24, which is the output, makes an electrical connection to an armature 26 pivotally connected at the center of the disk 23. The armature 26 is rotated by appropriate linkages by the diaphragm 22 is accordance with the barometric pressure. In the illustrated embodiment, the armature 26 rotates counterclockwise from a zero pressure position, as shown, to a maximum calibrated pressure position of 1080 millibars. The other three printed circuits, identified by the numerals 27, 28, and 29, form an annular array of two hundred twenty-five radial contact surfaces, or so-called bits around the disk 23 at equally spaced intervals. The circuits 27, 28, and 29 are continuously connected to the references 17, 18, and 19, respectively, so that as the armature 26 rotates counterclockwise, the references 17, 18, and 19 modify the temperature-humidity signal in the oscillator control circuit 13 in a permutation dictated by the particular sequence of connections of the bits to each of the circuits 27, 28, and 29.

The bits of the circuits 27, 28, and 29 are conveniently divided into thirty-two segments, the first four and last one being shown. The first four segments are at the low pressure end of the array and are identified by the numerals 1, 2, 3, and 4; and the last segment is at the high pressure end of the array and is identified by the numeral 32. Each segment therefore comprises seven bits. The particular combination and permutation of bits connected to each of the circuits 27, 28, and 29 is different for each segment, thereby affording a code for discrete values of pressure. For example, as the armature 26 rotates counterclockwise from the zero pressure position, the temperature-humidity signal at the circuit 13 will be sequentially modified once by the reference 17, and then six times by the reference 18. In code form, this sequence is represented as ABBBBBB. Then as the armature 26 moves through segment 2, the control circuit 13 is connected once to reference 17, four times to reference 18, once to reference 19, and once again to reference 18; or ABBBBCB. It should now be apparent that since each segment makes a permutation of circuit connections different from the other thirty-one segments, the exact position of the wiper around the disk 23 can be determined from observing the particular sequence of any eight consecutive bits.

The coding switch 21 can be calibrated for discrete pressures at each bit. A typical coding disk calibration having a pressure range suitable for high altitude meteorological investigations is as follows:

CODING DISK CALIBRATION

*Wiper position vs. barometric pressure, millibars*

| Permutation | Segment | Bit | | | | | | |
|---|---|---|---|---|---|---|---|---|
| | | 1 | 2 | 3 | 4 | 5 | 6 | 7 |
| ABBBBBB | 1 | 0 | 5 | 10 | 14 | 19 | 24 | 29 |
| ABBBBCB | 2 | 34 | 39 | 43 | 48 | 53 | 58 | 63 |
| ABBBCBB | 3 | 67 | 72 | 77 | 82 | 87 | 91 | 96 |
| ABBBCCB | 4 | 101 | 106 | 111 | 116 | 121 | 125 | 130 |
| ABBCBBB | 5 | 135 | 140 | 145 | 149 | 154 | 159 | 164 |
| ABBCBCB | 6 | 169 | 174 | 178 | 183 | 188 | 193 | 198 |
| ACCCBBC | 29 | 944 | 949 | 954 | 959 | 964 | 968 | 973 |
| ACCCBCC | 30 | 978 | 983 | 988 | 993 | 997 | 1,002 | 1,007 |
| ACCCCBC | 31 | 1,012 | 1,017 | 1,021 | 1,026 | 1,031 | 1,036 | 1,041 |
| ACCCCCC | 32 | 1,046 | 1,050 | 1,055 | 1,060 | 1,065 | 1,070 | 1,075 |
| A | 33 | 1,080 | | | | | | |

From the typical calibration chart, the pressure corresponding to a particular bit can be found. For example, when an observer detects the first bit series of ABBBBBB, the chart shows that the armature 26 has just swept across the segment 1 representing a change in pressure from 0 to 29 millibars. Each bit, being equally spaced over the segment 1, represents an increase of slightly less than five millibars.

It should now be apparent that the effect of the impedance change in the oscillator control circuit 13 is to produce a series of discrete shifts in pulse rate of the temperature-humidity signal at the output of the oscillator 14, and, finally, a discrete shift in the rate of radio frequency burst appearing at the output of the transmitter 16.

Figure 3:
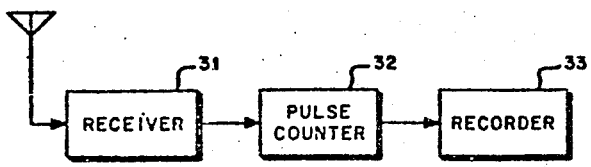
FIG. 3 represents a single-line block diagram of a receiving station.

The receiving and processing of the transmitted temperature, humidity and pressure data is performed by the apparatus represented in FIG. 3. This apparatus may be airborne, shipborne, or at a ground station. The radio signal is received and converted by a receiver 31 into pulses similar to the waveform at the output of the oscillator 14. This signal is then fed to a pulse counter 32 where it is converted to a D.C. voltage proportional to the pulse rate and which is capable of driving the pen in a strip-chart recorder 33.

FIG. 5 pictorially represents a typical strip-chart of temperature, humidity and pressure data plotted by the recorder 33 as the armature 26 of the coding switch 21 rotates counterclockwise from the 0-pressure position to the beginning of segment 5 during an atmospheric traverse. The heavy solid curves indicate the upper (temperature) and lower (humidity) excursions of the recording pen as switch 12 alternates between temperature sensor 10 and humidity sensor 11. The broken lines, which do not actually appear on the chart, represent the temperature and humidity measured by the radiosonde without modification by any of the references 17, 18, 19. Temperature and humidity values are indicated as D.C. voltages which are converted by appropriate conversion factors to degrees Fahrenheit and percentages, respectively. The displacement of the solid curves at any time during the atmospheric traverse due to one of the references 17, 18, and 19 is the same for both the upper and lower pen excursions and the amount is known. Hence, a substantially continuous record of temperature and humidity appears on the chart. The difference between any two displacements or either the upper or lower excursion also provides a calibration reference for the chart ordinates of temperature and humidity. That is, curve displacement can be correlated to changes in impedance at the oscillator control circuit 13 by observing the change caused by switching from one reference impedance to another. The sequence of displacements of the curves as the armature 26 sweeps across a segment also reveals the pressure. After observing the permutation of the displacements over a single segment, the pressure variation can be established from the coding disk calibration chart. In FIG. 5, for example, segment 1 produces deviations in temperature and humidity corresponding to the reference series ABBBBBB representing a change in barometric pressure from 0 to 29 millibars. Since the radiosonde descends at a relatively constant rate, the barometric pressure will increase substantially logarithmically. This is revealed on the strip chart by the fact that the segments, along the time scale, decrease in length.

It should now be apparent that the radiosonde of the present invention provides substantially continuous transmission of three atmospheric conditions, such as temperature, humidity, and pressure, throughout its descent from the upper atmosphere to the surface, thereby providing synoptic measurements of meteorological data. Temperature and humidity information is electronically switched on a fixed time basis, thereby making the sampling rate independent of altitude or pressure. Barometric pressure, on the other hand, operates a coding switch which imparts discrete displacements of the temperature and humidity signals in permutations indicative of the pressure. The form in which the data is received at the receiving station is such that the various data can be readily processed and separately stored on tapes and the like. The data can also be further processed into usable forms for transmission to other stations.

It will be understood that various changes in the details, materials, steps, and arrangement of parts, which have been herein described and illustrated in order to explain the nature of the invention, may be made by those skilled in the art within the principle and scope of the invention as expressed in the appended claims.

What is claimed is:

1. A radiosonde for telemetering meteorological conditions during its descent from the upper atmosphere, comprising: a temperature sensor exposed to the atmosphere and having an electrical output signal proportional to the temperature of the atmosphere, a humidity sensor exposed to the atmosphere and having an electrical output signal proportional to the humidity of the atmosphere, a cyclical switch having two inputs electrically connected to the outputs of said temperature and humidity sensors for producing a first electrical signal at the output thereof representing temperature for one-half of a cycle and humidity for the other half of the cycle whereby the temperature and humidity are continuously monitored irrespective of radiosonde altitude, a plurality of references each having a discrete constant electrical output signal different from the others, a commutator having a plurality of contacts selectively connected to the outputs of said references and an armature for selectively connecting the output of one of said references to the output of said commutator producing thereby a second electrical signal at the output thereof, a pressure sensor exposed to the atmosphere and having a mechanical output signal proportional to the barometric pressure and operatively connected to the armature of said commutator, said commutator contacts being arranged in a series for sequential permutations indicative of the mechanical output signal of said pressure sensor, an oscillator control circuit having two inputs respectively connected to receive said first and second electrical signals and to continuously modify each other producing thereby a third electrical signal at the output thereof, an oscillator having an input connected to receive said third signal for producing a pulse output at a rate proportional to said third signal, and a transmitter having an input connected to the output of said oscillator for transmitting radio frequency bursts at a rate proportional to the pulse rate; whereby comprehensive and synoptic measurements of the meteorological data are obtained.

2. A radiosonde for telemetering meteorological conditions during its descent from the upper atmosphere, comprising: a first sensor exposed to the atmosphere and having an electrical output signal proportional to a first condition of the atmosphere, a second sensor exposed to the atmosphere and having an electrical output signal proportional to a second condition of the atmosphere, a cyclical switch having two inputs electrically connected to the outputs of said first and second sensors for producing a first electrical signal at the output thereof representing the first condition for one-half of a cycle and the second condition for the other half of the cycle whereby the first and second conditions are continuously monitored irrespective of radiosonde altitude, a plurality of references each having a discrete constant electrical output signal different from the others, a commutator having a plurality of contacts selectively connected to the outputs of said references and an armature for selectively connecting the output of one of said references to the output of said commutator producing thereby a second electrical signal at the output thereof, a third sensor exposed to the atmosphere and having a mechanical output signal proportional to a third condition and operatively connected to the armature of said commutator, said commutator contacts being arranged in a series for sequential permutations indicative of the mechanical output signal of said third sensor, an oscillator control circuit having two inputs respectively connected to receive said first and second electrical signals and to continuously modify each other producing thereby a third electrical signal at the output thereof, an oscillator having an input connected to receive said third signal for producing a pulse output at a rate proportional to said third signal, and a transmitter having an input connected to the output of said oscillator for transmitting radio frequency bursts at a rate proportional to the pulse rate; whereby comprehensive and synoptic measurements of the meteorological data are obtained.

3. A meteorological telemetering system for use at high altitudes, comprising: a radiosonde including a temperature sensor exposed to the atmosphere and having an electrical output signal proportional to the temperature of the atmosphere, a humidity sensor exposed to the atmosphere and having an electrical output signal proportional to the humidity of the atmosphere, a cyclical switch having two inputs electrically connected to the outputs of said temperature and humidity sensors for producing a first electrical signal at the output thereof representing temperature for one-half of a cycle and humidity for the other half of the cycle whereby the temperature and humidity are continuously monitored irrespective of radiosonde altitude, a plurality of references each having a discrete constant electrical output signal different from the others, a commutator having a plurality of contacts selectively connected to the outputs of said references and an armature for selectively connecting the output of one of said references to the output of said commutator for producing a second electrical signal at the output thereof, a pressure sensor exposed to the atmosphere and having a mechanical output signal proportional to the barometric pressure and operatively connected to the armature of said commutator, said commutator contacts being arranged in a series for sequential permutations indicative of the mechanical output signal of said pressure sensor, an oscillator control circuit having two inputs respectively connected to receive said first and second electrical signals and to continuously modify each other producing thereby a third electrical signal at the output thereof, an oscillator having an input connected to receive said third signal for producing a pulse output at a rate proportional to said third signal, and a transmitter having an input connected to the output of said oscillator for transmitting radio frequency bursts proportional to the pulse rate; and receiving station including a receiver for detecting the radio frequency bursts and producing a proportional pulse rate output, a pulse counter having an input connected to the receiver output and having a variable voltage output proportional to the pulse rate, and a recorder having an input connected to the pulse counter output for recording the voltage variations.

4. A radiosonde for use with a rocket comprising: first electrical transducer means having analog output signals proportional to atmospheric temperature and humidity, switch means connected to said first transducer means for alternately conducting said analog signals from said first transducer means to the output of said switch means whereby the temperature and humidity are continuously monitored irrespective of radiosonde altitude, second electrical transducer means having a sequentially permutated output of discrete signals indicative of barometric pressure, oscillator means connected to receive the output signals from said switch means and said second transducer means for continuously modifying said cyclical analog and discrete signals with each other for producing thereby a pulse rate proportional to said received signals and means for transmitting a radio frequency in accordance with said pulse rate.

5. A radiosonde for use with a rocket comprising: first electrical transducer means having analog output signals proportional to two separate and distinct atmospheric conditions, switch means connected to said first tranducer means for alternately conducting said analog signals to the output thereof whereby said two atmospheric conditions are continuously monitored irrespective of radiosonde altitude, second electrical transducer means having a sequentially permutated output of discrete signals indicative of another atmospheric condition, oscillator means connected to receive the output signals from said switch means and said second transducer means and to continuously modify said cyclical analog and discrete signals with each other producing thereby a pulse rate proportional to said received signals, and means for transmitting a radio frequency in accordance with said pulse rate.

6. A meteorological telemetering system comprising: a radiosonde including first electrical transducer means having analog output signals proportional to atmospheric temperature and humidity, switch means connected to said first transducer means for alternately conducting said analog signals to the output of said switch means whereby the temperature and humidity are continuously monitored irrespective of radiosonde altitude, second electrical transducer means having a sequentially permutated output of discrete signals indicative of barometric pressure, oscillator means connected to receive the outputs from said switch means and said second transducer means and to continuously modify said cyclical analog and discrete signals with each other producing thereby a pulse rate proportional to said received signals, and means for transmitting a a radio frequency in accordance with said pulse rate; and a receiving station including a receiver means for proportionally converting the transmitted radio frequency into a voltage, and recording means for producing a visible record of variations in said voltage.

References Cited by the Examiner
UNITED STATES PATENTS

| 2,283,919 | 5/42 | Diamond et al. | 73—170 |
| 2,860,326 | 11/58 | Walton | 340—347.3 |
| 3,007,134 | 10/61 | Kolb | 73—411 |

OTHER REFERENCES

Article: "Pulse Transmitter for Rocket Research," by D. G. Mazur from "Electronics," November 1954.

RICHARD C. QUEISSER, *Primary Examiner.*